March 3, 1970     R. F. SHARP ET AL     3,498,078
SPLIT UNIT FOR BOTH DOUBLE-HUNG AND SLIDING WINDOWS
Filed Aug. 20, 1968     2 Sheets-Sheet 1
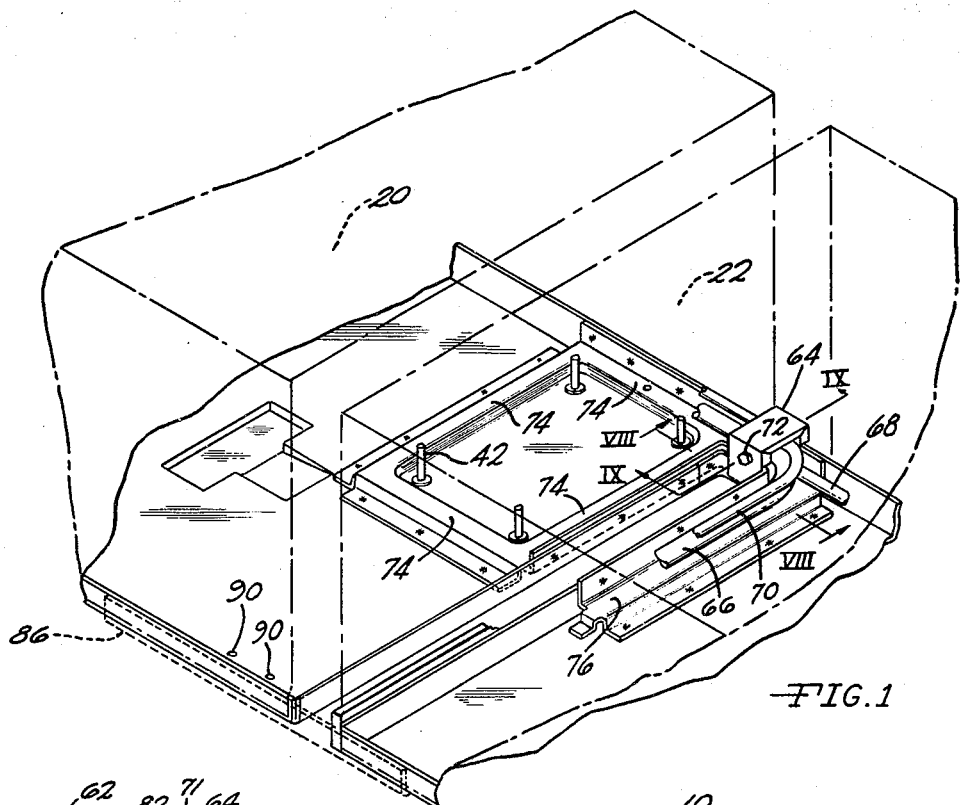
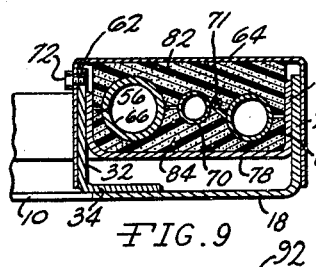
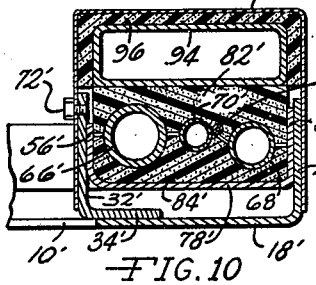
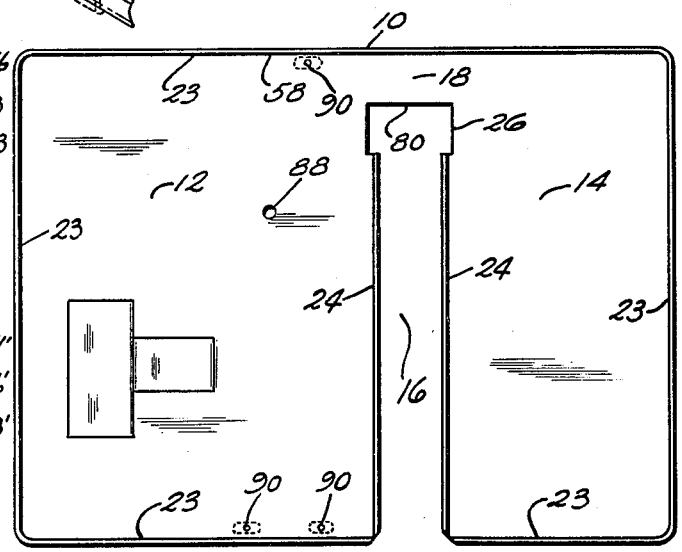
INVENTOR
RICHARD F. SHARP
ALFRED J. KOPP
BY Beaman & Beaman
ATTORNEYS

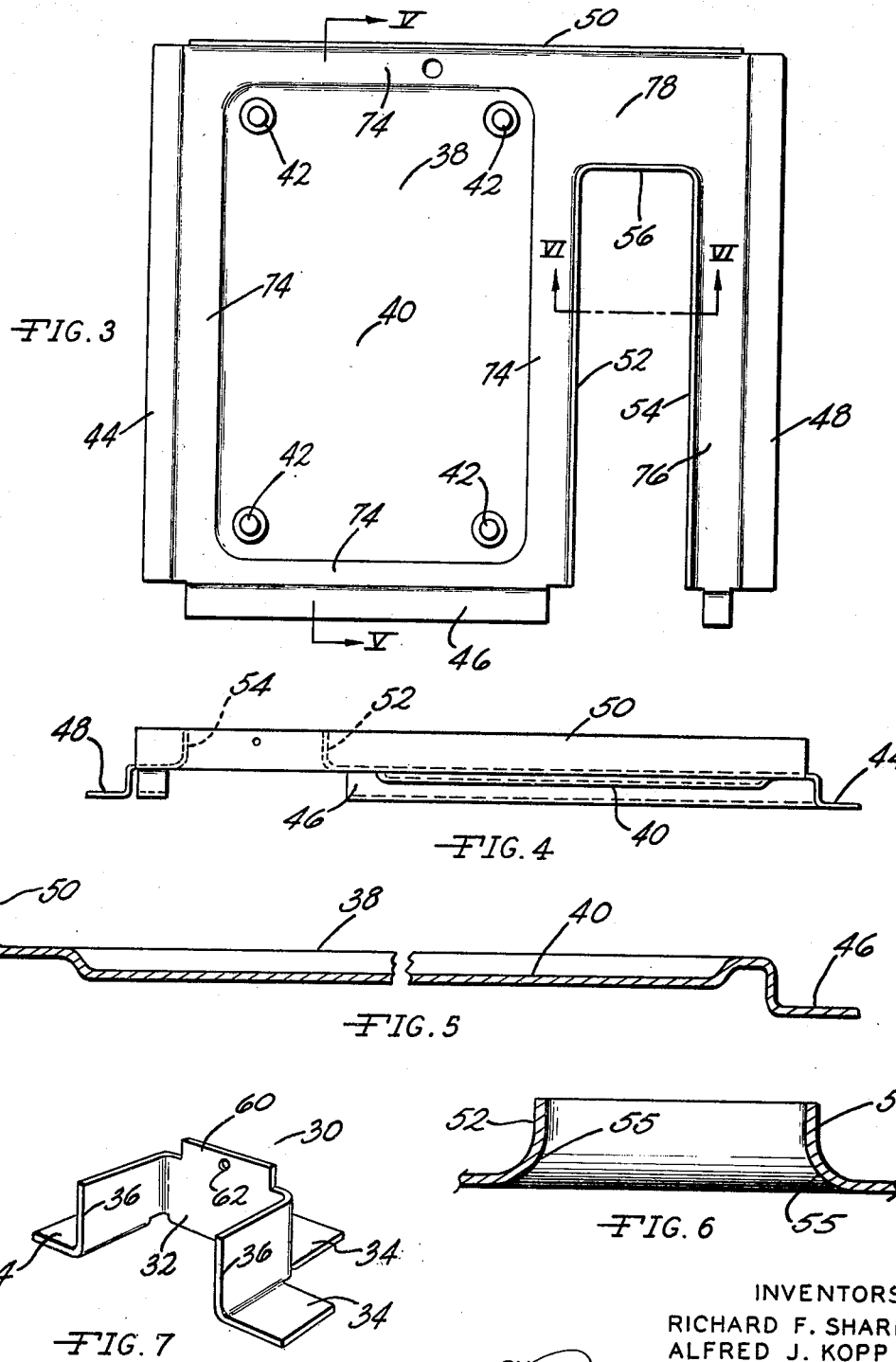

United States Patent Office 3,498,078
Patented Mar. 3, 1970

3,498,078
SPLIT UNIT FOR BOTH DOUBLE-HUNG AND SLIDING WINDOWS
Richard F. Sharp, Hillsdale, Mich., and Alfred J. Kopp, East Gary, Ind., assignors to Addison Products Company, Addison, Mich., a corporation of Michigan
Filed Aug. 20, 1968, Ser. No. 753,960
Int. Cl. F25d 19/00, 21/14
U.S. Cl. 62—262                              7 Claims

ABSTRACT OF THE DISCLOSURE

The present invention relates to improvements in the base structure and reinforcement thereof for air conditioning units of the "split" type adapted for installation in either a horizontal sliding or a double-hung window.

BACKGROUND OF THE INVENTION

Patent No. 3,372,557, issued Mar. 12, 1968, discloses the concept of a "split" two-section base for window air conditioning units of the type above described, each section of the base being generally rectangular and having a common connector located at one end of an elongated slot which accommodates a horizontal sliding window in its substantially closed position. When the air conditioning unit is used in a double-hung window, the common connector between the base sections defines a substantially closed position of the window as disposed between the condenser and evaporator housings carried in spaced relation on the base.

NATURE OF THE INVENTION

It is an object of the present invention to improve the strength characteristics of the main structural component of the "split" window air conditioning unit so as to simplify the installation of the unit and yet meet the strength and safety standards such as those established by the Underwriters Laboratories of Chicago, Ill.

As disclosed in the above mentioned patent, a two-section base is provided to support the condenser and evaporator housings in spaced relation to each other. A slot defines the two sections of the base and terminates at a common connector portion for the base sections. The present invention is concerned with improvements in the fabrication of the slot-defining structure and the reinforcement of the base sections in the area of the slot and the common connector portion to enable the use of simple leveling screws in the installation of the unit rather than difficult-to-apply support brackets.

The improvements herein disclosed are, in practice, embodied in a highly competitive household product which is especially designed to be capable of being transported from the place of purchase and installed by a home owner in either a sliding or double-hung window. To that end the housings for the condenser and evaporator, which are located on opposite sides of the window pane insulating these housings from each other, must be of inexpensive light-weight construction providing no appreciable structural strength to the assembled unit as installed in the window.

Being the main structural component of the assembled unit, the design of the two-section base in window air conditioning units of the type described is critical in order to meet strength and safety specifications and yet hold weight and cost to a minimum. As a result, the main portion of the base upon which the condenser and evaporator housings are carried is, of necessity, fabricated from relatively light gauge metal. In the areas of the main base portion where additional strength is required reinforcing sheet metal laminations of specific form are provided in association with certain of the flanges of the main base portion to impart to the light-weight base a high degree of strength and rigidity with a minimum use of materials.

DRAWINGS

In the drawings:
FIG. 1 is a fragmentary perspective view of the main base structure as reinforced, the housing supported thereon being shown in dotted outline,
FIG. 2 is a plan view of the main base as formed prior to application of the reinforcing structure,
FIG. 3 is a plan view of the principal reinforcing element,
FIG. 4 is an end view of FIG. 3,
FIG. 5 is a cross-sectional view of FIG. 3 taken on line V—V of FIG. 3,
FIG. 6 is a cross-sectional view taken on line VI—VI of FIG. 1,
FIG. 7 is a perspective view of the reinforcement for the inner end of the slot in the base,
FIG. 8 is a cross-sectional view taken on line VIII—VIII of FIG. 2 showing the form of the flanges defining the slot in the main base,
FIG. 9 is a cross-sectional view taken on line IX—IX of FIG. 1, and
FIG. 10 is a view similar to FIG. 9 of a modified form of the invention.

As shown in FIGS. 1 and 2, the main base 10 comprises sections 12 and 14 spaced by a slot 16 which terminates at a common connector portion 18 for the sections 12 and 14. Condenser and evaporator housings 20 and 22, respectively, are indicated in dotted outline in FIG. 1 and are shown supported on the sections 12 and 14 of the base 10.

As more clearly shown in FIG. 2, the base 10 has flanged outside edges 23 which are preferably drawn in practice but which may be merely turned to avoid the use of more expensive deep drawing material.

The spaced opposed flanges 24, defining the opposed sides of the slot 16, are preferably fabricated by blanking out a rectangular opening at 26 in the base 10, shearing the base from one edge of the opening 26 to the outer edge of the base 10 and then turning the material on opposite sides of the shear line to provide the flanges 24.

To reinforce the flanges 24 as well as the base 10 in the area of the opening 26, a sheet metal bracket 30, shown in FIG. 7, is provided. As illustrated, the bracket 30 has a main U-shaped upright portion 32 having ears 34 for spot welding the bracket 30 to the base 10 adjacent the edges of the base 10 defining the opening 26. It will be noted from FIG. 1 that the vertical edges 36 of the bracket 30 are aligned with and abut the inner ends of the flanges 24.

Referring to FIGS. 3, 4 and 6, the principal reinforcing element 38 for the base 10 is shown as taking the form of a sheet metal plate-like member associated in laminated relation with the base 10 by spot welding and embracing three sides of the slot 16, as defined by the flanges 24 and the bracket 30.

To stiffen the element 38, it is debossed in the area 40 upon which the compressor is supported and held in position by studs 42. L-shaped flanges 44, 46 and 48 are provided for spot welding the element 38 in laminated box-section relation with the horizontal or web portion of the base 10. Upturned flanges 50, 52, 54 and 56 are provided for laminated association by spot welding with the flanges 24, bracket 30 and the peripheral flange portion 58 of the base 10 and substantially complete the box-section relationship of the element 38 with the area of the base 10 upon which it is superimposed. The flanges 52 and 54 are preferably drawn with relatively large radii 55 to increase their rigidity.

As shown in FIG. 7, the bracket 30 has an upper extension portion 60 which carries a threaded aperture 62. In FIG. 1 the removable inverted U-shaped housing 64 is shown for concealing the usual conduit and the tube elements extending between the condenser and evaporator housing which, in the illustrated form, comprise the electrical wiring conduit 66, drain tube 68 and refrigerant tube 70. A screw 72 holds the housing in position by being received in the threaded aperture 62.

It is to be understood from FIG. 1 that the height of the housing 64, as installed on the bracket 30, will determine the lowermost or "closed" position of the lower sash of a double-hung window with the air conditioning unit installed. For this reason, the height of the housing 64 is held to a minimum, in practice, and is dimensioned to do no more than accommodate the components of the air conditioning unit, conduit and tube units extending between the condenser and evaporator housings.

The box-like reinforcing sections or portions which embrace the slot 16 result from the spacing of the web portions 74 and 76 from the base sections 12 and 14, respectively, as well as the spacing of the web portion 78 from the portion 80 of the common connector 18. As the conduit 66 and tubes 68 and 70 are preferably disposed above the web 78, to accommodate such elements the height of the housing 64 above the portion 80 of the base 10 is influenced by the vertical spacing of the portions 78 and 80.

When strength and rigidity requirements necessitate materially increasing the vertical spacing between the portions 78 and 80, as compared to that shown in the illustrated form, it is anticipated that the conduit 66 and the tubes 68 and 70, some or all of them, may be carried between the portions 78 and 80 to hold the height of the structure in the region of the common connector 18 to a minimum. Obviously, the location of any one or all of the elements 66, 68 and 70 between the laminations of the reinforced base structure may tend to complicate assembly and maintenance procedures.

As more clearly shown in FIG. 9, the electrical conduit 66, drain tube 68, refrigerant tube 70 and capillary tube 71 are shown located between top and bottom gaskets 82 and 84 to substantially seal the area surrounding these functional elements embraced by the housing 64.

At the time the unit is shipped from its manufacturing source for distribution, an L-shaped bracket 86, as shown in FIG. 1, is attached, by suitable removable fasteners, to the base 10 in reinforcing relation and bridging the open end of the slot 16. If the unit is to be used in a double-hung window, the bracket 86 will remain in the position shown. However, when the unit is to be installed in a horizontal sliding window, the bracket 86 is removed and discarded.

Suitable plastic sealing material (not shown) is used, in practice, to seal the peripheral edges of the structural element 38 in its laminated association with the base 10. A small hole 88 is preferably provided in the base 10 below the debossed area 40 to provide a drain hole for any moisture which might accumulate between the base 10 and the element 38.

Some dampening and attenuation of the vibrations and noise of the compressor have been obtained by supporting the compressor on the diaphragm defined by the debossed area 40 and disposed in spaced relation with the base 10, the diaphragm being one wall of an air chamber which is substantially closed except for the small drain hole 88.

T-nuts 90, welded to the underside of the base 10, extend upwardly through holes in the base 10 to provide threaded apertures to receive suitable leveling screws which, at the time of installation of the unit in a window, are adjusted to abut the exterior sill structure of the window to give support to the unit in its installed position. The use of leveling screws in lieu of the brackets, as shown in the aforesaid patent, has been made possible by the improved structural characteristics of the present invention and has greatly simplified the installation of the unit by unskilled persons.

In FIG. 10 is shown a modification of the form of the invention of FIGS. 1 through 9 wherein provisions are made for an exhaust vent between the evaporator and condenser housings of the unit. This is accomplished by increasing the height of the housing 64 to accommodate an exhaust duct disposed above the functional conduit and tube structure of FIG. 9. As illustrated, the housing 92, which corresponds to the housing 64, extends above the gasket 82' to receive the exhaust duct 94. A gasket 96 embraces the duct 94 on three sides to seal the same. The duct 96 may be regulated in the manner disclosed in U.S. Patent No. 3,392,546.

The prime reference characters appearing in FIG. 10 indicate structural details corresponding in function to those indicated by the same unprimed reference characters in FIG. 9.

It will be appreciated that the present invention greatly reduces the inventory which must be maintained by a dealer or distributor of window air conditioners as the same unit may be used in both horizontal sliding and double-hung windows. Moreover, by eliminating the need for involved bracket structure to support the unit as installed in the window, an unskilled consumer may purchase the unit over the counter and install the same himself using only leveling screws to support the condenser section from the exterior sill structure.

We claim:

1. In a "split" type window air conditioning unit adapted for installation in both horizontally sliding and double-hung windows, a reinforced base structure for carrying the condenser and evaporator housings comprising a main base of rectangular form having two sections partially separated from each other by spaced opposed edge portions defining a slot extending inwardly from one edge of the base and terminating adjacent an opposite edge of the base, said opposite edge having an upright flange with the region between said flange and the inner end of said defined slot constituting a common connector between said base sections, upright flanges defining the sides and inner end of said slot, a reinforcing plate-like member shaped to be super-imposed upon said main base in embracing relation with the sides and inner end of said slot, said member having upright flanges complementary to the flanges of said slot and said opposite edge with the flanges of said member, slot and opposite edge being attached, said member also having downwardly projecting L-shaped flanges disposed along the edges of said member remote from said slot and attached to said base sections whereby web portions of said member are disposed in spaced relation to said base sections and substantially define therewith box section reinforcing structure in the region of said slot and common connector.

2. In a "split" type window air conditioning unit as defined in claim 1 wherein said main base and said reinforcing member are formed of sheet metal and the connected flanged portions are welded together.

3. In a "split" type air conditioning unit as defined in claim 1, wherein said reinforcing member has a debossed area on which the compressor disposed in the condenser housing is carried.

4. A generally rectangular laminated sheet metal base structure for "split" type air conditioning units comprising a main base portion and a superimposed reinforcing portion, said base and reinforcing portion having opposed web portions in vertical spaced relation, flanged laminated edges of said base and reinforcing portions defining a slot extending inwardly from one edge of said base structure and terminating adjacent the opposite edge thereof, peripheral flanged portions of said reinforcing portion remote from said defined slot being laminated with portions of said main base portion whereby said slot is embraced along its opposite sides and inner end by structure of box-like section.

5. In a "split" window air conditioning unit of the type described, a pan having an elongated, generally rectangular slot defined therein, a laminated reinforcing structure for said pan embracing three sides of said slot, said structure including a diaphragm portion in spaced relation to said pan and a compressor supported on said diaphragm.

6. In a "split" window air conditioning unit as defined in claim 4 wherein said structure defines with said pan a substantially sealed chamber.

7. In a "split" window air conditioning unit of the type described, a generally rectangular pan having an elongated generally rectangular slot extending inwardly from one edge across a major portion of the width of said pan to divide the same into an evaporator side and a compressor side, a reinforcing structure in laminated relation with said pan and disposed along a substantial portion of the length of said slot as well as embracing the closed end thereof, said structure having peripheral flange portions defining web portions in spaced parallel relation to said pan to provide stiffening box section reinforcement along opposite sides of said slot, and leveling structure on the condenser side of said pan and disposed to one side of said slot constituting the sole support structure for the unit in association with the exterior sill structure of the window in which it is installed.

References Cited
UNITED STATES PATENTS

| | | | |
|---|---|---|---|
| 2,316,704 | 4/1943 | Moore | 62—262 |
| 2,945,359 | 7/1960 | MacLeod | 62—262 |
| 3,309,889 | 3/1967 | Capp | 62—262 |

WILLIAM J. WYE, Primary Examiner

U.S. Cl. X.R.

62—285